United States Patent [19]

Lange et al.

[11] 3,727,879
[45] Apr. 17, 1973

[54] SHUT-OFF VALVE

[75] Inventors: Peter J. Lange; Harcourt G. Runnings, both of Seattle, Wash.

[73] Assignee: Red Dot Corporation, Seattle, Wash.

[22] Filed: Dec. 4, 1970

[21] Appl. No.: 95,249

[52] U.S. Cl. ...................251/84, 251/88, 251/298, 251/306, 277/177
[51] Int. Cl. ............................................F16k 1/226
[58] Field of Search ................251/84, 85, 86, 173, 251/298, 304–308, 88, 287, 297; 277/177

[56] References Cited

UNITED STATES PATENTS

| | | | |
|---|---|---|---|
| 2,355,017 | 8/1944 | Stone | 251/308 |
| 2,792,790 | 5/1957 | Capps | 277/177 X |
| 3,107,691 | 10/1963 | Schwarz | 251/297 X |
| 3,141,470 | 7/1964 | La Fontaine | 251/305 X |
| 3,290,001 | 12/1966 | Taylor | 137/527.8 X |
| 3,531,083 | 9/1970 | Rohrer | 251/287 X |
| 3,612,483 | 10/1971 | Pool | 251/306 |
| 2,809,662 | 10/1957 | Ray | 251/306 X |
| 2,883,149 | 4/1959 | Florentini | 251/306 |
| 2,385,510 | 9/1945 | Harwood | 251/306 |
| 3,126,193 | 3/1964 | Atherton | 251/88 |
| 3,378,227 | 4/1968 | Newell | 251/304 |
| 3,521,857 | 7/1970 | Over | 251/305 |

FOREIGN PATENTS OR APPLICATIONS 973,079  10/1964  Great Britain ........................251/304

*Primary Examiner*—Henry T. Klinksiek
*Attorney*—Christensen, Sanborn & Matthews

[57] ABSTRACT

A shut-off valve is disclosed wherein the flow is put through a cylindrical passage controlled by valve means including a truncated spheroidal closure member which is pivotally mounted in the passage to swing about an axis intersecting the cylindrical axis of the passage at an acute angle thereto, and normally centered at the intersection of the aforesaid axes. The member is separated at its periphery from the wall of the passage by a clearance in a diametral plane thereof which traverses the full circumference of the member; and there is a pressure deformable O-ring relatively slidably engaged on the periphery of the member in the clearance, which is adapted to compressibly interengage between the wall of the passage and the periphery of the member in the closure position of the member. There are also means operative to retain the O-ring on the periphery of the member as the member is swung into and out of the closure position thereof.

10 Claims, 9 Drawing Figures

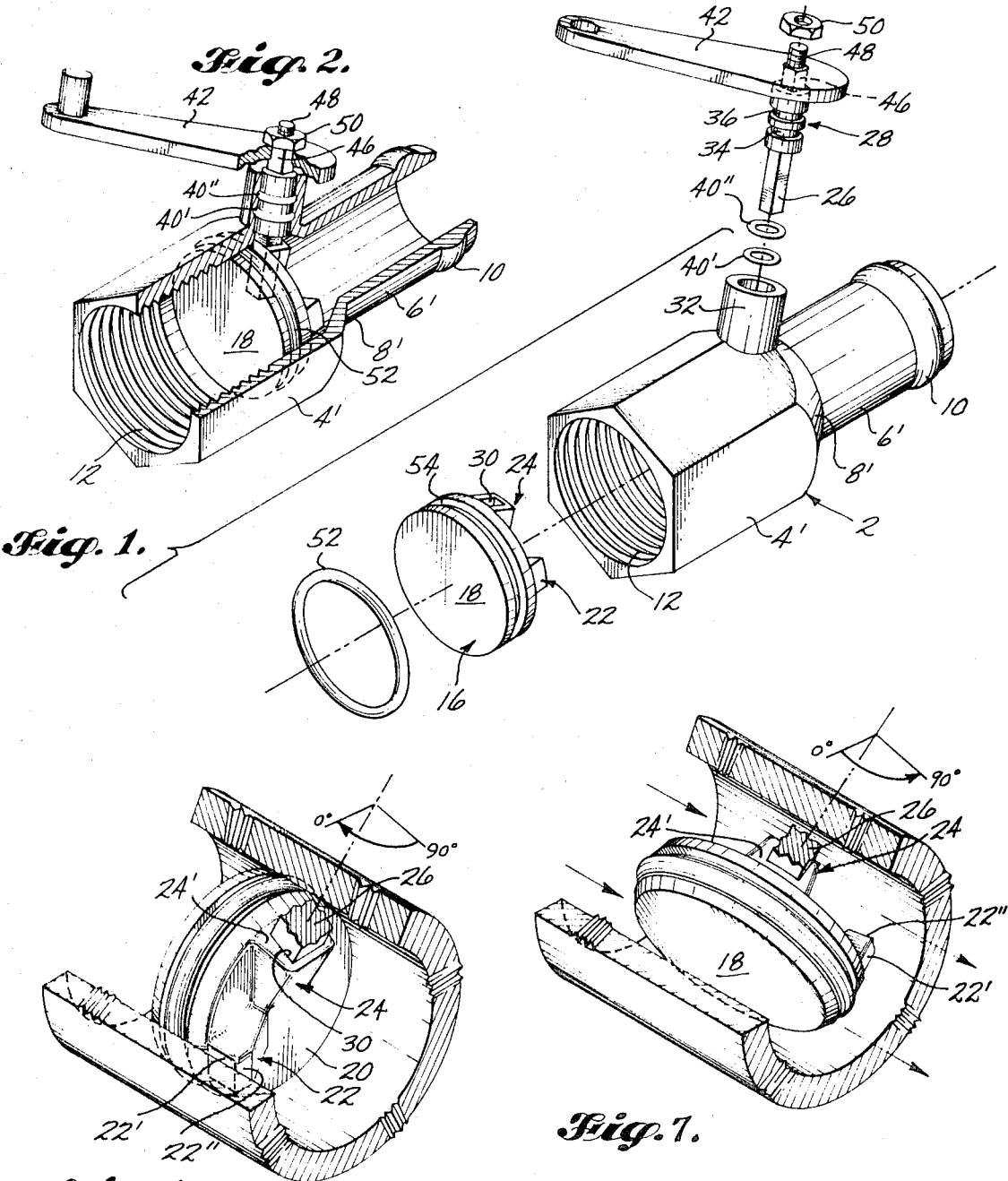

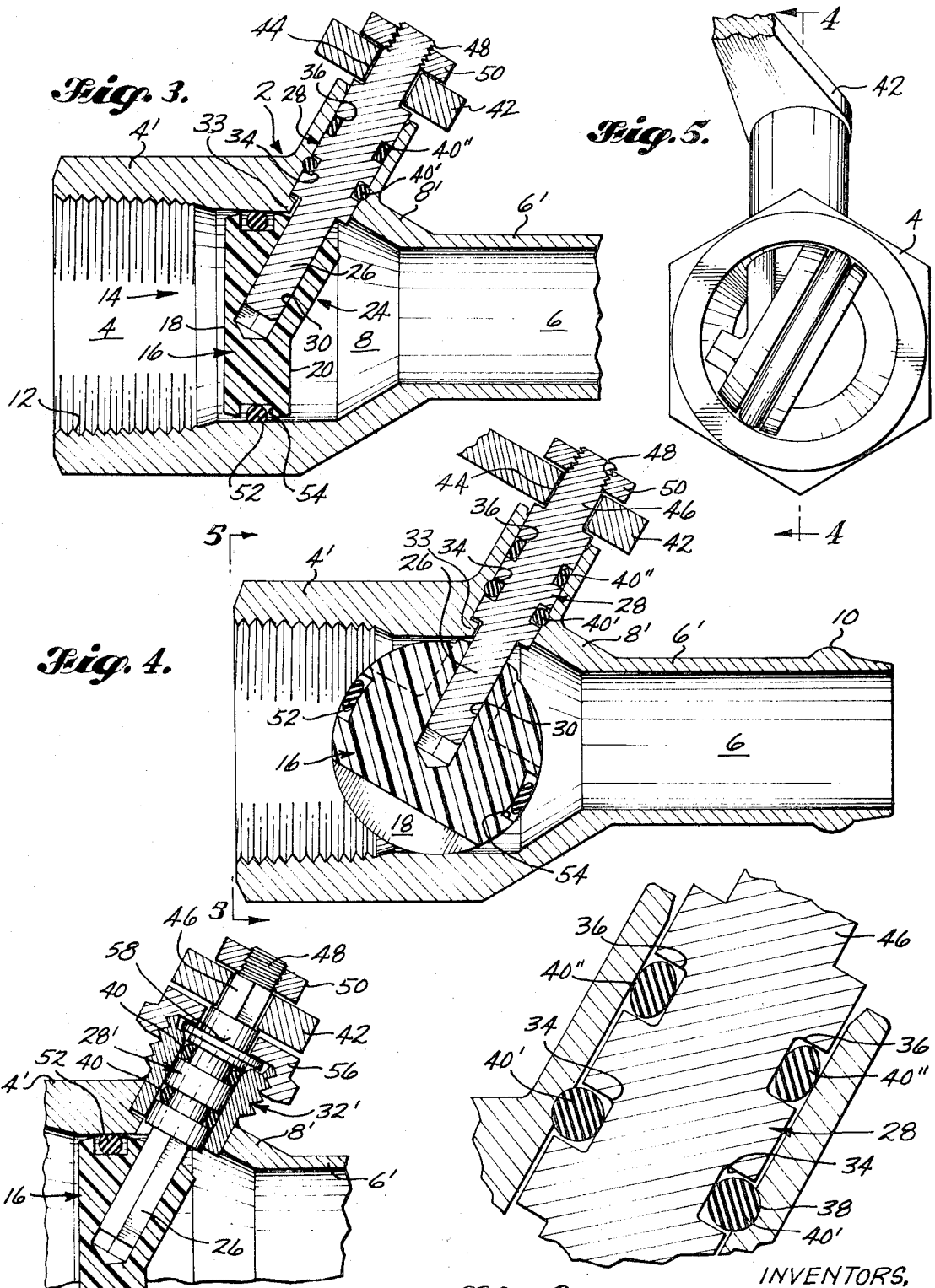

SHUT-OFF VALVE

FIELD OF THE INVENTION

This invention relates to values for controlling the flow through a passage carrying fluid; and in particular to valves of this nature which are adapted to fully close and seal the passage against flow.

BACKGROUND OF THE INVENTION INCLUDING CERTAIN OBJECTS THEREOF

Such valves are commonly known as shut-off valves, and normally include a closure member which is mated to a seat about the periphery of the passage in the closure position thereof. The fully closed condition is disrupted or prevented, however, when debris in the flow accumulates on or about the seat, or on the closure member, or on both. Also, repeated seating and reseating of the closure member produces wear in the member, or the seat, or both, such that ultimately a full closure condition may no longer be possible. Misalignment of the closure member in the passage can also prevent full closure; and in fact, most shut-off valves are not intended for frequent usage, because misalignment and wear so often result in failure on the part of the valve to achieve full closure.

One object of the present invention therefore, is to produce a valve of this nature which is devoid of a seat, and which closes without undergoing the conventional seating process that has given rise to these problems in the past. Another object is to provide a valve of this nature in which the valve mechanism cooperates with a plain cylindrical passage, and effectively cleans or purges the passage of debris as it is employed to control flow therethrough. A further object is to provide a valve of this nature in which the valve closure member mechanically wipes the walls of the passage during the process of opening and closing the valve, so as to forcibly displace debris that might otherwise accumulate on the wall, or on the closure member, or on both. A still further object is to provide a valve of this nature wherein the closure member carries its own pressure deformable seal, and subjects the seal to compressible interengagement between it and the wall of the passage as it assumes the closure position therein. Another object is to provide a valve of this nature wherein the seal and closure member are mounted and operated in such a fashion as to minimize wear to both in the opening and closing of the valve. Still another object is to provide a valve of this nature wherein the closure member and seal offer a lower resistance to flow, and represent less blockage to flow, in the fully open condition of the valve, than other such members in shut-off valves known to the prior art. Other objects include the provision of a valve of this nature wherein the closure member and seal operate over a 90° course between the fully open and closed positions of the valve, and tend to center themselves in the closed position to maintain proper alignment; and wherein these and other components of the valve mechanism are cheap to manufacture, and to renew, yet are fully reliable in operation when subjected to repeated usage in the valve. Still other objects include the provision of a valve of this nature wherein the valve mechanism is simple in construction and employs one or more O-rings at critical points therein, not only to effect a seal where necessary, but also to interlock various other components of the valve with one another. Still further objects will become apparent from the description of the invention which follows hereafter.

SUMMARY OF THE INVENTION

These and other objects are realized by a valve of our invention wherein the flow is put through a cylindrical passage controlled by valve means including a truncated spheroidal closure member which is pivotally mounted in the passage to swing about an axis intersecting the cylindrical axis of the passage at an acute angle thereto, and normally centered at the intersection of the aforesaid axes. The member is separated at its periphery from the wall of the passage by a clearance in a diametral plane thereof which traverses the full circumference of the member; and there is a pressure-deformable O-ring relatively slidably engaged on the periphery of the member in the clearance, which is adapted to compressibly interengage between the wall of the passage and the periphery of the closure member in the closure position of the member. There are also means operative to retain the O-ring on the periphery of the member as the member is swung into and out of the closure position thereof.

The ring retainer means may include a pair of stops which are raised on the periphery of the member to either side of the plane of the ring. For example, the member may have a circumferential groove in the aforesaid diametral plane thereof, and the ring may be relatively slidably engaged in the groove, both in the circumferential and in the axial sense thereof.

The closure member is also mounted so as to be shiftable in relation to the housing, lengthwise of the pivotal axis thereof. For example, it may be fixed on a rotatable stem which is slidably inserted in the housing, so that both can shift in relation to the housing, along the axis of the stem. Or the closure member may be slidably keyed to a stem which is rotatably journalled in the housing, but fixed against shifting axially in relation thereto, so that only the closure member is shiftable along the axis of the stem.

In the presently preferred embodiments of the invention, the closure member has a bore therein, and one end of the stem is slidably received in the bore. In order to key the member to the stem, for rotation therewith, both the bore and the aforesaid one end of the stem have complemental polyhedral configurations, in cross sectional planes thereof.

The stem is journalled in an opening in the wall of the passage, and the stem and opening have mutually opposing circumferential grooves therein, in and between which a second O-ring is engaged, to fix the axial position of the stem in the housing. In addition, a third O-ring is engaged between the stem and the housing on the opposite side of the second O-ring from the passage, to seal the valve means in the housing.

Alternatively, the housing may have a nipple projecting outwardly therefrom, about the opening in the wall of the passage, and the axial position of the stem may be fixed by providing the stem with a pair of longitudinally spaced flanges, between which a threadedly engaged nut on the nipple is interposed in the assembly. For purposes of turning the shaft, one flange on the stem may take the form of a handle.

In the foregoing embodiments, moreover, the truncated face of the member is parallel to the plane of the ring; and in fact, the member is doubly truncated on opposite sides of the plane of the ring, and the truncated faces of the same are parallel to one another to form a spheroidal disc. To avoid the necessity for external stops, the disc has a pair of stops raised on the downstream truncated face thereof which abut the wall of the passage in the open and closed positions of the member. The bore for the stem is defined in part by a boss which is raised on the downstream face of the disc, and which terminates in the spheroidal surface of revolution of the same.

BRIEF DESCRIPTION OF THE DRAWINGS

These and other features of the invention will be better understood by reference to the accompanying drawings which illustrate one of the presently preferred embodiments thereof.

In the drawings

FIG. 1 is a exploded perspective view of the valve unit;

FIG. 2 is an assembled cut-away perspective view of the unit;

FIG. 3 is a longitudinal cross-sectional view of the unit, in the axial plane of the stem, when the valve is closed;

FIG. 4 is a similar view when the valve is open;

FIG. 5 is an upstream end view of the unit, when the valve is open;

FIG. 6 is a cut-away part perspective view of the unit when the valve is closed;

FIG. 7 is a similar view when the valve is open;

FIG. 8 is a part corss-sectional view of the stem of the valve; and

FIG. 9 is another such view of a modified stem.

DESCRIPTION OF THE PREFERRED EMBODIMENT

Referring to the drawings, it will be seen that the valve unit comprises a tubular housing 2 having upstream and downstream cylindrical passages 4 and 6, respectively, therein which have differing diameters and are separated by a conical step 8. The wall 6' of the downstream passage 6 has a plain cylindrical cross section with the exception of an embossed circumferential rib 10 on the exterior thereof, from where the wall tapers slightly longitudinally inwardly toward the downstream end of the housing to serve as the male member for screw clamped hose fittings (not shown) made therewith on the downstream side of the unit. The wall 4' of the upstream passage 4 has a hexagonal cross section, and the mouth 12 of the passage is interiorly taper-threaded to receive the male member of threaded fittings (not shown) made therewith on the upstream side of the unit. Moreover, the threading is of greater diameter than the passage 4 itself, so that when the fitting is made, the unit still provides for substantially smooth laminar flow into the passage.

The valve mechanism 14 for controlling flow through the unit comprises a truncated spheroidal Nylon closure member 16 which in this case is doubly truncated in parallel planes to form a disc. The upstream face 18 of the disc 16 has a smooth planar appearance, whereas the downstream face 20 has a pair of bosses 22 and 24 raised thereon which are swept-back in configuration and spaced apart in the angular sense of the face 20. One 22 of the bosses serves as a stop for the disc in the open and closed positions thereof. The other 24 serves as a bearing for the interiorly projecting end portion 26 of a rotatable stem 28 with which the disc 16 is keyed in the rotational sense, but relatively slidable in the longitudinal sense. The stem 28 is generally cylindrical in cross section, and is rotatably journalled in the housing 2 on an axis which intersects the cylindrical axis of the passage 4 at an acute angle thereto. The interiorly projecting end portion 26 of the stem is square in cross section, however, and is slidably received in a complementally cross-sectional bore 30 which is deeply relieved in the radially oriented face 24' of the bearing 24, on an axis intersecting the center of the disc 16, so that in its mounted condition, the disc is normally centered at the intersection of the pivotal axis of the stem 28 and the cylindrical axis of the passage 4. The radially oriented face 24' of the bearing is described by the spherical surface of revolution of the disc. The radially-oriented face of the stop has a pair of facets 22' and 22", which are disposed in a pair of dihedral planes. One facet 22' serves as the stop for the closed position of the disc; while the other 22" serves as the stop for the open position thereof.

The stem 28 is journalled in the opening of a cylindrically cross-sectioned nipple 32 which is integral with the housing and protrudes outwardly on a perpendicular from the conical wall 8' of the step 8, at a point adjacent the wall 4' of the upstream passage 4, so that the axis of the stem angles into the passage 4 upstream from the step 8. A lip 33 at the inner end of the opening in the nipple, forms a stop with which to limit the inward insertion of the stem in the assembly process. HOwever, the stem is located and sealed by other means including a pair of longitudinally spaced, circumferential grooves 34 and 36 of orthogonal cross section in the body of the stem, and a single groove 38 of half round cross section in the wall of the nipple 32. Each of the grooves 34 and 36 in the stem has a 70 durometer Buna-N O-ring 40' and 40" forcibly engaged therein; and when the stem is inserted in the nipple, the more inwardly disposed O-ring 40' on the stem expands into the groove 38 in the wall of the nipple, to lock the stem in position. The more outwardly disposed ring 40" remains under compression, however, to seal the stem against leakage, there being sufficient play between the more inwardly disposed ring 40', and the groove 34 accommodating it, to prevent a static pressure condition arising between the two rings.

The stem is rotated by mean of a handle 42 which has a square cross-sectioned aperture 44 therein, by which it is slidably engaged over a similarly cross-sectioned portion 46 of the stem that is rabbetted to form an inner stop for the handle, and threaded at its tip 48 to carry a retainer nut 50 as an outer stop for the same.

While the disc 16 serves as the principal closure member for the unit, a completely sealed closure condition is achieved by a third 70 durometer Buna-N O-ring 52 which is peripherally slidably engaged on the disc in a wide circumferential groove 54 of orthogonal cross section that is formed in the diametral plane of the disc parallel to the truncated faces 18 and 20 thereof. The ring 52 has a cross section and diameter which enable it to rotate circumferentially in relation to the disc, as well as to shift axially of the disc, within the width of the groove 54. Yet the diameter and cross section of the ring 52 are also such that it undergoes compression between the disc and the cylindrical wall 4' of the upstream passage 4, when the disc is swung into and out of the closure position thereof. See FIGS. 3 and 9.

Undue wear on the ring 52 is prevented by the relative rotational and axial "play" which is allowed the ring and the disc 16, and the play which is allowed the disc within the housing, along the axis of the stem. As the disc approaches and leaves the closure position, progressively greater angular segments of the ring are compressed, or released from the compressed condition, respectively. In the precess, however, the frictional contact between the ring and the wall of the housing, generates forces on the ring crosswise of the axis of the disc, and each such force has a component or vector extending axially of the groove, as well as one extending circumferentially thereof. These latter forces are accommodated by the play between the ring and the disc; and simultaneously the disc is able to "ride" or "float" on the stem in the axial sense thereof, so that the disc and the ring are always free to recenter or realign themselves within the passage 4, in accordance with the changing magnitude of the frictional forces generated therebetween.

Throughout the process, moreover, the side walls of the groove 54 serve as stops to prevent the ring from being extruded off of the disc.

An angle of 15°–60° is employed between the axis of stem and the axis of the passage 4. The dimensions of the groove 54, as well as the relative dimensions of the passage 4 and the disc 16; take into account the liquid absorption capacity of both the ring 52 and the disc, as well as the functional aspects of the respective elements.

A flat, gasket-like backup ring (not shown) of a diameter corresponding to that of the passage, may be added to the groove 54 on the downstream side of the O-ring 52.

As seen in FIG. 9, the stem may be locked in position by means other than that shown in FIGS. 1–8; as for example, by threading the outside of the nipple 32', and employing a retainer nut 56 on the same to interengage between a circumferential flange 58 on the stem 28; and the handle 42. In such a case, however, one or more compression rings 40 are still employed to seal the stem 28' against leakage.

What is claimed is:

1. A shut-off valve comprising a housing having a cylindrical passage therein, a stem which is rotatably journalled in the housing, and projects within the passage on an axis of rotation intersecting the cylindrical axis of the passage at an acute angle thereto, means interposed between the stem and the housing to seal and locate the stem against shifting, lengthwise the rotational axis thereof, and a truncated spheriodal closure member which is slidably keyed to the projecting portion of the stem, so as to be rotatable in conjunction with the stem, but shiftable in relation to the stem lengthwise the rotational axis thereof, and which is normally centered at the intersection of the aforesaid axes, and oriented with respect to the stem so that the diametral plane of the member coinciding with the periphery thereof is perpendicular to the axis of the passage in the closure position of the member, the member being separated at its periphery from the wall of the passage by a clearance in the aforesaid diametral plane thereof, and having a circumferential groove about the periphery thereof, which in turn has a pressure deformable O-ring disposed therein, which ring protrudes from the periphery of the member into the clearance, and is adapted to compressibly interengage between the wall of the passage and the bottom of the groove, in the closure position of the member, but which ring is otherwise slidably engaged on the bottom of the groove, and spaced apart from at least one of the sidewalls of the groove, in the axial directions of the member, so as to be shiftable in relation to the member, in the circumferential and axial directions thereof, as the member approaches and leaves the closure position thereof.

2. The shut-off valve according to claim 1 wherein the member has a bore therein, and the projecting portion of the stem is slidably received in the bore, but terminated short of the bottom of the bore.

3. The shut-off valve according to claim 1 wherein the truncated face of the member is parallel to the aforesaid diametral plane thereof.

4. The shut-off valve according to claim 3 wherein the member is double truncated on opposite sides of the plane thereof, and the truncated faces of the same are parallel to one another to form a spheroidal disc.

5. The shut-off valve according to claim 4 wherein the disc has a pair of stops raised on the downstream truncated face thereof which abut the wall of the passage in the open and closed positions of the member.

6. The shut-off valve according to claim 4 wherein the projecting portion of the stem is slidably received in a bore in the disc, defined in part by a boss which is raised on the downstream face of the disc, and which terminates on the spheroidal surface of revolution of the same.

7. The shut-off valve according to claim 2 wherein the bore and the projecting portion of the stem have complemental polyhedral configurations, in cross-sectional planes thereof, to key the member to the stem, for rotation therewith.

8. The shut-off valve according to claim 2 wherein the housing has an opening therein, the stem is inserted in the opening and the stem and the opening have mutually opposing circumferential grooves therein, in and between which an elastomeric O-ring is compressibly engaged, to locate the stem.

9. The shut-off valve according to claim 8 wherein a second elastrometic O-ring is engaged between the stem and the housing on the opposite side of the first-mentioned elastomeric O-ring from the passage, to seal the stem in the housing.

10. A shut-off valve comprising a housing having a cylindrical passage therein, and an opening in the wall of the passage, a stem which is rotatably journalled in the opening, and projects within the passage on an axis of rotation intersecting the cylindrical axis of the passage at an acute angle thereto, there being mutually opposing circumferential grooves in the stem and the opening, and means including an elastomeric O-ring compressibly engaged in and between the grooves, to seal and locate the stem against shifting, lengthwise the rotational axis thereof, and a truncated spheroidal closure member which is slidably keyed to the projecting portion of the stem, so as to be rotatable in conjunction with the stem, but shiftable in relation to the stem lengthwise the rotational axis thereof, and which is normally centered at the intersection of the aforesaid axes, and oriented with respect to the stem so that the diametral plane of the member coinciding with the periphery thereof, is perpendicular to the axis of the passage in the closure position of the member, the member being separated at its periphery from the wall of the passage by a clearance in the aforesaid diametral plane thereof, and having a circumferential groove about the periphery thereof, which in turn has a pressure deformable O-ring disposed therein, which ring protrudes from the periphery of the member into the clearance, and is adapted to compressibly interengage between the wall of the passage and the bottom of the groove in the closure position of the member, but which ring is otherwise slidably engaged on the bottom of the groove, and spaced apart from at least one of the sidewalls of the groove, in the axial directions of the member, so as to be shiftable in relation to the member, in the circumferential and axial directions thereof, as the member approaches and leaves the closure position thereof.

* * * * *